3,183,237
HEXAHYDROINDOLO[3,2-g]INDOLIZINE COMPOUNDS

Yao Hua Wu and Harold J. Rhodes, Evansville, Ind., assignors to Mead Johnson & Company, Evansville, Ind., a corporation of Indiana
No Drawing. Filed Mar. 21, 1963, Ser. No. 266,812
15 Claims. (Cl. 260—295)

The present application is concerned with the polycyclic carbinol 2-hydroxymethyl-1,2,3,5,6,11b-hexahydroindolo-[3,2-g]indolizine, with processes for its preparation, and intermediates useful therein. The substances and transformations involved are illustrated by the following reaction scheme in which Formula II represents the polycyclic carbinol with which the present invention is concerned, and Formula III the indolizinium ester from which it is prepared. The numbering system for nomenclature purposes of this ring system is indicated in Formula II. The names of these substances are:

Formula II: 2-hydroxymethyl-1,2,3,5,6,11b-hexahydroindolo[3,2-g]indolizine
Formula III: 2-alkoxycarbonyl-2,3,5,6-tetrahydroindolo[3,2-g]-1H-indolizinium salt
Formula IV: 2-alkoxycarbonyl-1,2,3,5,6,11b-hexahydroindolo[3,2-g]indolizine

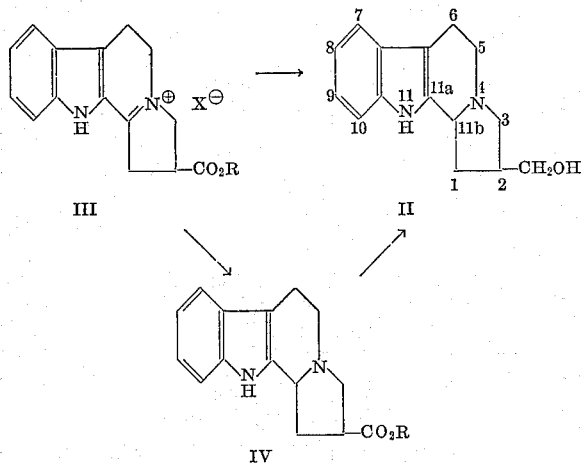

The indolizine carbinol of Formula II is useful as an intermediate in the preparation of biologically active esters. One group of such esters is described in our copending application Serial Number 266,802, filed herewith, which is concerned with a group of substances which possess sedative tranquilizer, muscle relaxant and hypotensive activity.

In Formula III and IV R is an alkyl group of 1 to 4 carbon atoms such as methyl, ethyl, propyl, butyl, or isobutyl, and X is the anion of a mineral acid or strong organic acid such as the hydrocarbon sulfonic acids and hydrocarbon acid sulfates. For instance, X may be bromide, chloride, iodide, sulfate, acid sulfate, phosphate, chlorophosphate, alkyl phosphate, dichlorophosphate, dibromophosphate, bromophosphate, dialkyl phosphate, nitrate, perchlorate, methanesulfonate, ethanesulfonate, butanesulfonate, undecanesulfonate, benzenesulfonate, naphthalenesulfonate, toluenesulfonate, ethyl sulfate, methyl sulfate, hexyl sulfate, decyl sulfate, etc.

Reduction of the indolizinium carboxylic ester of Formula III to the desired carbinol of Formula II may be brought about in a single step or through the intermediate of Formula IV. Intermediates of Formula IV are produced by catalytic hydrogenation of the indolizinium carboxylic esters of Formula III employing noble metal or nickel hydrogenation catalysts under conventional hydrogenation conditions. Preferred reaction conditions employ a noble metal catalyst such as finely divided platinum, palladium, or rhodium supported if desired on a finely divided material such as charcoal or diatomaceous earth at atmospheric or slightly elevated pressure, e.g., 1–3 atmospheres. Temperatures from room temperature to about 60° C. may be satisfactorily employed. A convenient form of nickel catalyst is the so-called Raney nickel catalyst which is preferably employed at somewhat higher pressures, for instance 100–200 atmospheres, and temperatures, e.g., room temperature to 200° C.

The indolizinium carboxylic ester of Formula III can also be reduced to the indolizine carboxylate of Formula IV by sodium borohydride or potassium borohydride. This transformation takes place with facility under the reaction conditions outlined in following paragraphs concerned with the metal hydride reductions of either of the indolizinium carboxylates III or the indolizine carboxylates IV to the carbinol II, and is illustrated in Example 3B which follows. The stoichiometric requirement is for ¼ mole of reagent, but in practice several times that amount is preferably employed.

The single step process for the preparation of the indolizine carbinol of Formula II involves reduction of the indolizinium carboxylate of Formula III with an alkali metal aluminum hydride, such as lithium aluminum hydride or sodium aluminum hydride, or with lithium borohydride. The alkali metal borohydrides such as sodium borohydride and potassium borohydride are operable when employed in combination with at least one molecular proportion relative to borohydride of a metal halide such as lithium bromide, lithium chloride, aluminum chloride, and calcium iodide. The transformation is carried out under conditions ordinarily employed in the reduction of esters with the alkali metal aluminum hydrides and borohydrides. For instance, a solution of lithium aluminum hydride in a reaction inert solvent such as ether, dioxane, tetrahydrofuran, dibutyl ether, diisopropyl ether, or other liquid hydrocarbon ether or cyclic ether solvent is prepared and a suspension of the indolizinium carboxylic ester in the same ether solvent or a different reaction inert solvent is added thereto. Suitable solvents for this purpose include pyridine, N-ethyl morpholine, triethylamine, etc. Tetrahydrofuran is a satisfactory medium for both the intermediate of Formula III and the hydride reducing agent and is the preferred vehicle for carrying out the reaction. Reaction sometimes takes place satisfactorily at room temperature but reflux temperature is preferred. Periods of from about 1 to 24 hrs. are employed.

Transformation of the indolizine carboxylates of Formula IV to the indolizine carbinols of Formula II is carried out under much the same conditions employing an alkali metal aluminum hydride or borohydride as the single step method just described. The conversion of IV to II, however, requires less of the relatively expensive hydride reducing agent and therein lies one of the advantages of operating through intermediate IV.

The indolizine carboxylates of Formula IV are also of interest as intermediates in preparing products other than the carbinol of Formula II. Biologically active amides may be prepared from the carboxylates of Formula IV by reaction thereof with ammonia, or primary or secondary amines such as 6-aminopenicillinic acid or other amines which may or may not be biologically active in themselves but which provide biologically active amides on reaction with the esters of Formula IV.

The stoichiometry of alkali metal aluminum hydride reduction of esters and azomethines is such that the transformation of III to II requires 1¼ molecular proportions of alkali metal aluminum hydride or borohydride per molecular proportion of indolizinium carboxylate III. Of this amount, the reactive hydrogen atom on the nitrogen atom in the 11-position consumes ¼ molecular proportion of the lithium or sodium aluminum hydride. The stoichiometric requirement of alkali metal aluminum hydride for the transformation of indolizine carboxylate IV to indolizine carbinol II is ¼ mole less due to the absence of the 11b-4 azomethine bond. In practice, it is preferable to use an excess of the hydride reducing agent to ensure reduction of the intermediate in the highest possible yield. Maximum yields have been obtained employing about 4 to 5 fold the theoretical quantity of hydride reducing agent in the laboratory. Relatively smaller amounts may be employed when operating on a large scale.

Since there are two asymmetric carbon atoms in the indolizine carbinol of Formula II, four stereoisomers exist, namely, two racemates each consisting of a pair of optical isomers. Each of these isomers is considered within the scope of this invention. The racemates are subject to separation by means such as fractional crystallization of the free base forms thereof or of acid addition salts thereof. The racemates may in turn be resolved into their optically active enantiomorphs by fractional crystallization of salts thereof with optically active acids such as d-camphorsulfonic acid, d-tartaric acid, l-tartaric acid, d-mandelic acid, l-mandelic acid, and others. The preparation of the purified racemates or optically active stereoisomers is of interest where the corresponding purified stereoisomeric form of the end product ester, such as those described in our copending application Serial Number 266,802 referred to above, is desired.

The starting materials of Formula III, that is the indolizinium carboxylates, are prepared by cyclodehydration of the alkyl 1-[2-(3-indolyl)ethyl]-5-oxopyrrolidine-3-carboxylates of Formula V. R in Formula V has the same meaning as above. The alkyl indolylethylpyrrolidine carboxylates of Formula V are prepared as described in copending application Serial Number 266,823 of Dr. Y. H. Wu filed herewith.

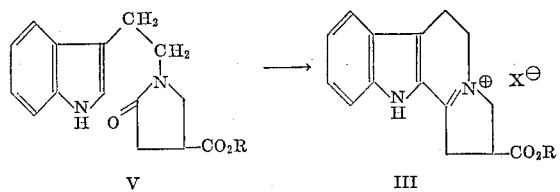

The cyclodehydration reaction for the preparation of the indolizinium carboxylates of Formula III is carried out by treatment of an alkyl indolylethylpyrrolidine carboxylate of Formula V with at least one equivalent of such a reagent as phosphorous oxychloride, phosphorous pentoxide, phosphorous pentachloride, aluminum chloride, thionyl chloride, zinc chloride, phosphorous oxybromide, or polyphosphoric acid. Reagents of this type are referred to in the art as cyclodehydrating agents. Since the precise nature of the chemical transformation relative to the cyclodehydrating agent itself is frequently not known, at least about an equal weight, and preferably more, thereof relative to alkyl indolylethyl pyrrolidine carboxylate of Formula V is employed.

The process is carried out under anhydrous conditions either in the presence of a reaction inert solvent such as chloroform, benzene, toluene, xylene, nitrobenzene, or tetralin, or in the absence of an organic solvent but using an excess of the cyclodehydrating agent as reaction medium. Temperatures in the range of about 25–200° C., preferably with anhydrous benzene as solvent and a reaction period of about 3 hrs. are employed. Reaction periods in the range of about ¼ to 24 hrs. are operable.

The reaction product, Formula III, resulting directly from the cyclodehydration process is a quaternary ammonium salt. The character of the anion in the crude reaction product is not clearly characterized when using cyclodehydrating agents from which multiple hydrolysis products are possible, such as phosphorous oxychloride or phosphorous oxybromide. This is of no consequence, however, with regard to the utility of the intermediate in further synthesis. When it is desired to prepare the intermediate as a purified homogeneous entity, it is convenient to substitute a simpler anion such as the chloride, bromide, sulfate, or nitrate anion. This is conveniently accomplished by treatment of a solution of the crude product with a strongly basic anion exchange resin such as a divinyl benzene cross-linked polystyrene containing quaternary ammonium functional groups in which the anion of the resin corresponds to the anion it is desired to introduce into the product of Formula III. One such resin is Dowex 1 in the chloride form. Use of this resin for a transformation of this type is described below.

The following examples are provided to illustrate the preparation of the compounds claimed herein and the processes used for their preparation. Various modifications of the specific reaction conditions described may be made as will be apparent to those skilled in the art.

*Example 1.*—*2-methoxycarbonyl-2,3,5,6-tetrahydroindolo [3,2-g]1H-indolizinium chloride*

Phosphorous oxychloride, 125.2 g. (0.82 mole, 75 ml.) is added dropwise during 1 hr. to a stirred solution of methyl 1-[2-(3-indolyl)ethyl]-5-oxopyrrolidine-3-carboxylate, 28.6 g. (0.1 mole), in 200 ml. of anhydrous benzene. The mixture is refluxed with stirring for 3 hrs. and allowed to stand at room temperature overnight. During this time a bright greenish-yellow crystalline mass separates from the original fluorescent solution. The solid is collected on a filter, washed with five 100 ml. portions of benzene, and dried in a vacuum desiccator over calcium chloride and sodium hydroxide. The resulting salt weighs 33.1 g., M.P. 143–147° C. It is considered to be the dichlorophosphate salt. A portion of the dichlorophosphate, 8.1 g., is dissolved in 350 ml. of absolute methanol. The filtered solution is passed through a column packed with a polyquaternary ammonium anion exchange resin in the chloride form (Dowex 1, 50–100 mesh). The column is eluted with absolute methanol until an aliquot of the eluate is negative to the silver nitrate halogen test (approx. 300 ml.). The eluate is concentrated to one-third of its initial volume, and diluted with isopropyl ether to cloudiness. 2-methoxycarbonyl-2,3,5,6-tetrahydroindolo[3,2-g]1H-indolizinium chloride precipitates and is isolated by filtration as long bright greenish-yellow needles, M.P. 191–193° C., dec. Recrystallization from methanol-isopropyl ether yields the purified product, M.P. 193–194° C.

*Analysis.*—C, 63.07; H, 5.88; Cl, 11.35; N, 9.08, which is in agreement with the formula $C_{16}H_{17}ClN_2O_2$. Infrared absorption maxima are exhibited by the substance at 0.5% concentration in KBr at 2.94, 3.09, 3.29, 3.41, 5.80, 6.13, 6.38, 6.42, 6.64, 6.73, 6.92, 7.27, 7.48, 7.62, 8.18, 8.22, 8.68, 9.24, 9.70, 10.63, 10.72, 13.00, 13.08$\mu$, and in the ultraviolet 281 m$\mu$.

*Example 2.*—*2-butoxycarbonyl-2,3,5,6-tetrahydroindolo [3,2-g]1H-indolizinium sulfate*

The procedure of Example 1 is repeated substituting n-butyl - 1 - [2 - (3 - indolyl) - ethyl] - 5 - oxopyrrolidine-3-carboxylate, 0.1 mole, as starting material for the methyl ester specified in that example. The product is isolated in the same fashion except that the sulfate form of the ion exchange resin is employed rather than the chloride form.

*Example 3.*—*2-methoxycarbonyl-1,2,3,5,6,11b-hexahydroindolo[3,2-g]indolizine and its hydrochloride*

A. BY CATALYTIC REDUCTION

A solution of 2-methoxycarbonyl-2,3,5,6-tetrahydroindolo[3,2 - g]1H - indolizinium chloride, 2.44 g. (8 mmoles), in 100 ml. of absolute methanol is hydrogenated at 2.58 kg./cm.$^2$ pressure using 0.2 g. of platinum oxide to provide the catalyst. The uptake of hydrogen is complete in less than 5 min. The filtrate after removing the catalyst is treated with sufficient isopropyl ether to induce cloudiness. The product crystallizes as colorless needles in clusters, M.P. 204–205° C., dec., weight 1.34 g. (54.7%).

*Analysis.*—C, 62.67; H, 6.19; N, 9.12, which is in agreement with the formula $C_{16}H_{18}N_2O_2 \cdot HCl$. Infrared absorption maxima are exhibited at the following wave lengths (c., 0.5% in KBr): 2.94, 3.19, 3.41, 4.00, 5.81, 6.17, 6.91, 6.99, 7.36, 7.45, 7.99, 8.23, 8.74, 9.26, 9.71, 9.95, 10.48, 10.86, 11.06, 12.04, 13.50μ.

B. BY SODIUM BOROHYDRIDE REDUCTION

A solution of 8 mmoles of the starting material specified in Example 3A in 80 ml. of methanol is added dropwise during a period of 20 min. to a stirred solution of sodium borohydride, 0.64 g. (16.2 mmoles) in 20 ml. of methanol. After standing at room temperature overnight, the mixture is concentrated to one-half of its original volume and diluted with 100 ml. of water. The aqueous mixture is extracted with three 50 ml. portions of ether. The combined ethereal extracts are concentrated to a solid residue (1.7 g.), which is recrystallized from ethanol to give the pure product, M.P. 167–169° C.

*Analysis.*—C, 70.97; H, 6.74; N, 10.33, which is in agreement with the formula $C_{16}H_{18}N_2O_2$.

*Example 4.—2-(n-butoxy)carbonyl-1,2,3,5,6,11b-hexahydroindolo[3,2-g]indolizine hydrochloride*

The procedure of Example 3A is repeated substituting 2 - (n - butoxy)carbonyl - 1,2,3,5,6 - tetrahydroindolo[3,2-g]1H-indolizinium chloride as starting material in that procedure. The product is isolated in substantially the fashion described in Example 3A.

*Example 5.—2-hydroxymethyl-1,2,3,5,6,11b-hexahydroindolo[3,2-g]indolizine*

A suspension of 2-methoxy-carbonyl-1,2,3,5-tetrahydroindolo[3,2-g]1H-indolizinium chloride, 12.19 g. (0.04 mole), in 300 ml. of tetrahydrofuran is added portionwise during 1 hr. to a stirred suspension of lithium aluminum hydride, 7.6 g. (0.2 mole), in 200 ml. of tetrahydrofuran. After being stirred and refluxed for 8 hrs., the reaction mixture is carefully treated with 60 ml. of cold 80% aqueous tetrahydrofuran to decompose the metal complex. The mixture is filtered. The solid cake is washed with two 200 ml. portions of hot tetrahydrofuran, and the combined filtrate and washings concentrated to a glass-like residue.

*Purified racemate A.*—The glass-like residue from the preceding is mixed with 75 ml. of chloroform and the internal wall of the glass container is scored to initiate crystallization. The crystalline product is collected on a filter and washed with three 25 ml. portions of chloroform, M.P. 182–186° C., dec., weight 2.88 g. (29.7%). Recrystallization from chloroform yields purified racemate A, M.P. 190–195° C., dec.

*Analysis.*—C, 73.88; H, 7.45; N, 11.38.

*Purified racemate B.*—The combined mother liquors and washings after separating racemate A are treated with n-hexane resulting in precipitation of an oil. On triturating with a small amount of chloroform, the product is obtained as crystalline solid, M.P. 165–168° C., yield: 3.03 g.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:
1. The process for the preparation of a compound selected from the group consisting of

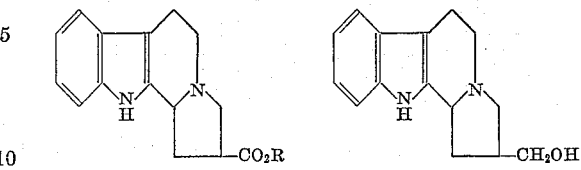

and the acid addition salts thereof wherein R is an alkyl group having up to 4 carbon atoms which comprises reacting a compound of the formula

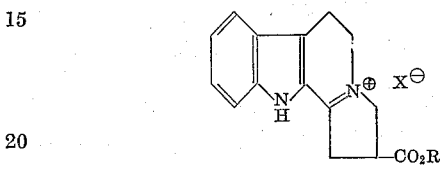

wherein R has the same meaning as above and $X^\ominus$ is the anion of an acid selected from the group consisting of a mineral acid, a hydrocarbon sulfonic acid having up to 12 carbon atoms, and a hydrocarbon acid sulfate having up to 12 carbon atoms with a reducing agent selected from the group consisting of (a) the alkali metal aluminum hydrides, (b) the alkali metal borohydrides, and (c) hydrogen in the presence of a catalyst selected from the group consisting of the platinum, palladium, rhodium, and nickel hydrogenation catalysts.

2. The process of claim 1 wherein at least 1¼ molecular proportions of a substance selected from the group consisting of lithium aluminum hydride, lithium borohydride, and sodium aluminum hydride is used as reducing agent thereby producing 2-hydroxymethyl-1,2,3,5,6,11b-hexahydroindolo[3,2-g]indolizine.

3. The process of claim 1 wherein hydrogen in the presence of a catalyst selected from the group consisting of the platinum, palladium, rhodium, and nickel hydrogenation catalysts is employed thereby producing 2-alkoxycarbonyl-1,2,3,5,6,11b - hexahydroindolo[3,2-g]-indolizine.

4. The process of claim 1 wherein at least ¼ molecular proportion of a substance selected from the group consisting of sodium borohydride and potassium borohydride is used as reducing agent, thereby producing corresponding 2-alkoxycarbonyl-1,2,3,5,6,11b-hexahydroindolo[3,2-g]-indolizine.

5. The process which comprises reacting 2-alkoxycarbonyl - 1,2,3,5,6,11b - hexahydroindolo[3,2 - g]indolizine wherein said alkoxy group contains up to 4 carbon atoms with at least one molecular proportion of a reducing agent selected from the group consisting of (a) lithium aluminum hydride, sodium aluminum hydride, lithium borohydride, and (b) sodium borohydride and potassium borohydride as reducing agents, at least one molecular proportion of a metal halide selected from the group consisting of lithium bromide, lithium chloride, aluminum chloride and calcium iodide being employed when a substance as designated in (b) is used as reducing agent, thereby producing 2-hydroxymethyl-1,2,3,5,6,11b-hexahydroindolo[3,2-g]indolizine.

6. A compound selected from the group consisting of substances of the formula

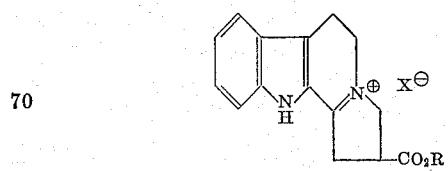

wherein R is an alkyl group having up to 4 carbon atoms and X is the anion of an acid selected from the group consisting of a mineral acid, a hydrocarbon sulfonic acid having up to 12 carbon atoms, and a hydrocarbon acid sulfate having up to 12 carbon atoms.

7. 2-methoxycarbonyl - 2,3,5,6 - tetrahydroindolo-[3,2-g]1H-indolizinium chloride.

8. 2-(n-butoxy)carbonyl-2,3,5,6-tetrahydroindolo-[3,2-g]1H-indolizinium sulfate.

9. A compound selected from the group of substances having the formula

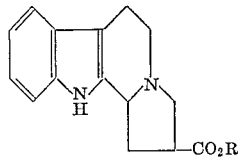

and the acid addition salts thereof wherein R is an alkyl group having up to 4 carbon atoms.

10. 2-methoxycarbonyl-1,2,3,5,6,11b-hexahydroindolo-[3,2-g]indolizine hydrochloride.

11. 2-(n - butoxy)carbonyl - 1,2,3,5,6,11b - hexahydroindolo[3,2-g]indolizine hydrochloride.

12. A compound selected from the group consisting of 2-hydroxymethyl-1,2,3,5,6,11b - hexahydroindolo[3,2-g]indolizine and the acid addition salts thereof.

13. The purified racemate of 2-hydroxymethyl-1,2,3,5,6,11b-hexahydroindolo[3,2-g]indolizine having M.P. 190–195° C.

14. The purified racemate of 2-hydroxymethyl-1,2,3,5,6,11b - hexahydroindolo[3,2 - g]indolizine having M.P. 165–168° C.

15. The process which comprises reacting alkyl 1-[2-(3-indolyl)ethyl]-5 - oxopyrrolidine-3 - carboxylate wherein said alkyl group contains up to four carbon atoms with at least one equivalent of a cyclodehydrating agent at a temperature of 25° C. to 200° C., thereby producing corresponding 2-alkoxycarbonyl-2,3,5,6-tetrahydroindolo-[3,2-g]1H-indolizium compound.

No references cited.

WALTER A. MODANCE, *Primary Examiner.*

NICHOLAS S. RIZZO, *Examiner.*